United States Patent
Nakai et al.

(10) Patent No.: US 8,892,810 B2
(45) Date of Patent: Nov. 18, 2014

(54) SEMICONDUCTOR DEVICE AND MEMORY PROTECTION METHOD

(75) Inventors: Hiroto Nakai, Yokohama (JP); Tatsunori Kanai, Yokohama (JP); Kenichi Maeda, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 13/399,185

(22) Filed: Feb. 17, 2012

(65) Prior Publication Data

US 2012/0216003 A1    Aug. 23, 2012

(30) Foreign Application Priority Data

Feb. 18, 2011 (JP) ................................. 2011-033719

(51) Int. Cl.
G06F 12/02 (2006.01)
G06F 9/54 (2006.01)

(52) U.S. Cl.
CPC ............ G06F 12/0246 (2013.01); G06F 9/544 (2013.01)
USPC ..... 711/103; 711/154; 711/163; 711/E12.091

(58) Field of Classification Search
CPC ............................. G06F 12/0292; G06F 12/02
USPC .......... 711/154, 170, 202, 203, 173, E12.001, 711/E12.091
See application file for complete search history.

(56) References Cited

U.S. PATENT DOCUMENTS

| 7,886,127 | B2 * | 2/2011 | Chen et al. ..................... 711/206 |
| 8,508,782 | B2 * | 8/2013 | Pinney ........................... 712/243 |
| 2008/0222397 | A1 * | 9/2008 | Wilkerson et al. ............ 712/220 |

FOREIGN PATENT DOCUMENTS

| JP | 4-205635 | 7/1992 |
| JP | 2001-56783 | 2/2001 |
| JP | 2008-242944 | 10/2008 |
| TW | 200907794 | 2/2009 |
| TW | 200910208 | 3/2009 |
| TW | 200937294 | 9/2009 |

OTHER PUBLICATIONS

Toshio Okamoto, et al., "A Micro Kernel Architecture for Next Generation Processors", Usenix Association, Micro-kernels and Other Kernal Architectures, Apr. 27, 1992, pp. 83-94.
Jeff Chase, et al., "Opal: A Single Address Space System for 64-bit Architectures", IEEE, 1992, pp. 80-85.
Office Action issued Jun. 25, 2013 in Japanese Patent Application No. 2011-033719 (with English translaiton).
Office Action issued Jun. 3, 2014 in Chinese Patent Application No. 201210038076.4 (with English Translation).
Office Action for Taiwanese Patent Application No. 101104582, mailed Jul. 7, 2014 (with English-language translation).

* cited by examiner

*Primary Examiner* — Pierre-Michel Bataille
(74) *Attorney, Agent, or Firm* — Oblon, Spivak, McClelland, Maier & Neustadt, L.L.P.

(57) ABSTRACT

According to one embodiment, a semiconductor device includes a processor, and a memory device. The memory device has a nonvolatile semiconductor storage device and is configured to serve as a main memory for the processor. When the processor executes a plurality of programs, the processor manages pieces of information required to execute the programs as worksets for the respective programs, and creates tables, which hold relationships between pieces of information required for the respective worksets and addresses of the pieces of information in the memory device, for the respective worksets. The processor accesses to the memory device with reference to the corresponding tables for the respective worksets.

17 Claims, 17 Drawing Sheets

FIG. 8   Virtual address space (WS1)

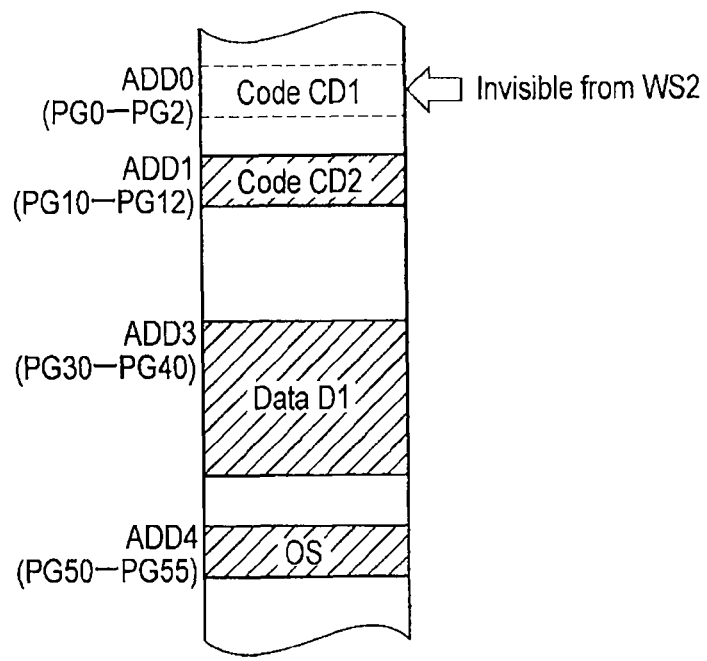
F I G. 10   Virtual address space (WS2)
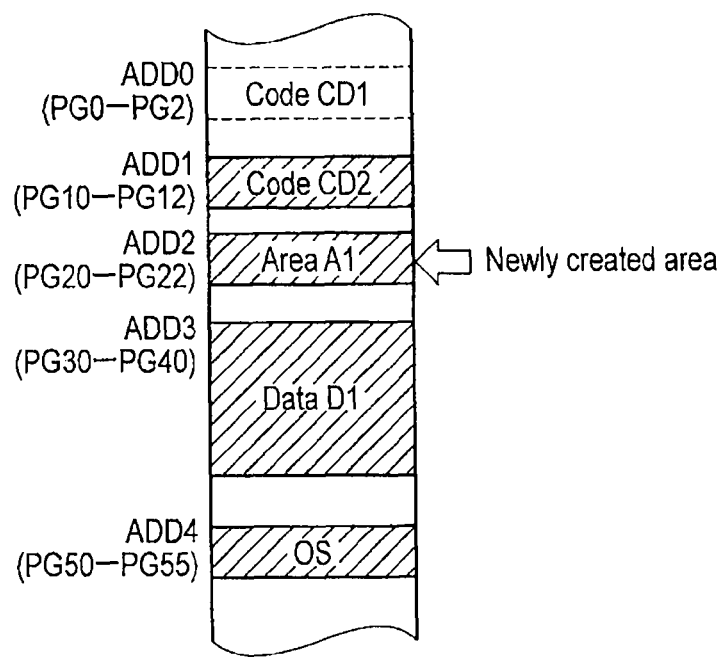
F I G. 11   Virtual address space (WS2)

Page table PT2

| | W | V | Physical address |
|---|---|---|---|
| ⋮ | ⋮ | ⋮ | |
| PG10 | 0 | 1 | |
| PG11 | 0 | 1 | Code CD2 |
| PG12 | 0 | 1 | |
| ⋮ | | | |
| PG20 | 1 | 1 | |
| PG21 | 1 | 1 | Area A1 |
| PG22 | 1 | 1 | |
| ⋮ | ⋮ | ⋮ | |
| PG30 | 1 | 1 | |
| PG31 | 1 | 1 | Data D1 |
| ⋮ | ⋮ | ⋮ | |
| PG40 | 1 | 1 | |
| ⋮ | ⋮ | ⋮ | |

⇐ Physical address of area A1 assigned

FIG. 12

Page table PT1

| | W | V | Physical address |
|---|---|---|---|
| ⋮ | ⋮ | ⋮ | |
| PG10 | 0 | 1 | |
| PG11 | 0 | 1 | |
| PG12 | 0 | 1 | |
| ⋮ | ⋮ | ⋮ | |
| PG20 | 1 | 1 | |
| PG21 | 1 | 1 | Area A1 |
| PG22 | 1 | 1 | |
| ⋮ | ⋮ | ⋮ | |
| PG30 | 1 | 1 | |
| PG31 | 1 | 1 | Data D1 |
| ⋮ | ⋮ | ⋮ | |
| PG40 | 1 | 1 | |
| ⋮ | ⋮ | ⋮ | |

⇐ Physical address of area A1 assigned

FIG. 13

Page table PT1

| | W | V | Physical address |
|---|---|---|---|
| PG0 | 0 | 1 | |
| PG1 | 0 | 1 | Code CD1 |
| PG2 | 0 | 1 | |
| ⋮ | ⋮ | ⋮ | |
| PG10 | 0 | 0 | |
| PG11 | 0 | 0 | |
| PG12 | 0 | 0 | |
| ⋮ | ⋮ | ⋮ | |
| PG30 | 1 | 1 | |
| PG31 | 1 | 1 | Data D1 |
| ⋮ | ⋮ | ⋮ | |
| PG40 | 1 | 1 | |
| ⋮ | ⋮ | ⋮ | |
| PG45 | 0 or 1 | 1 | |
| PG46 | 0 or 1 | 1 | Data D3 |
| PG47 | 0 or 1 | 1 | |
| ⋮ | ⋮ | ⋮ | |

⇐ Physical address of data D3 assigned

F I G. 17

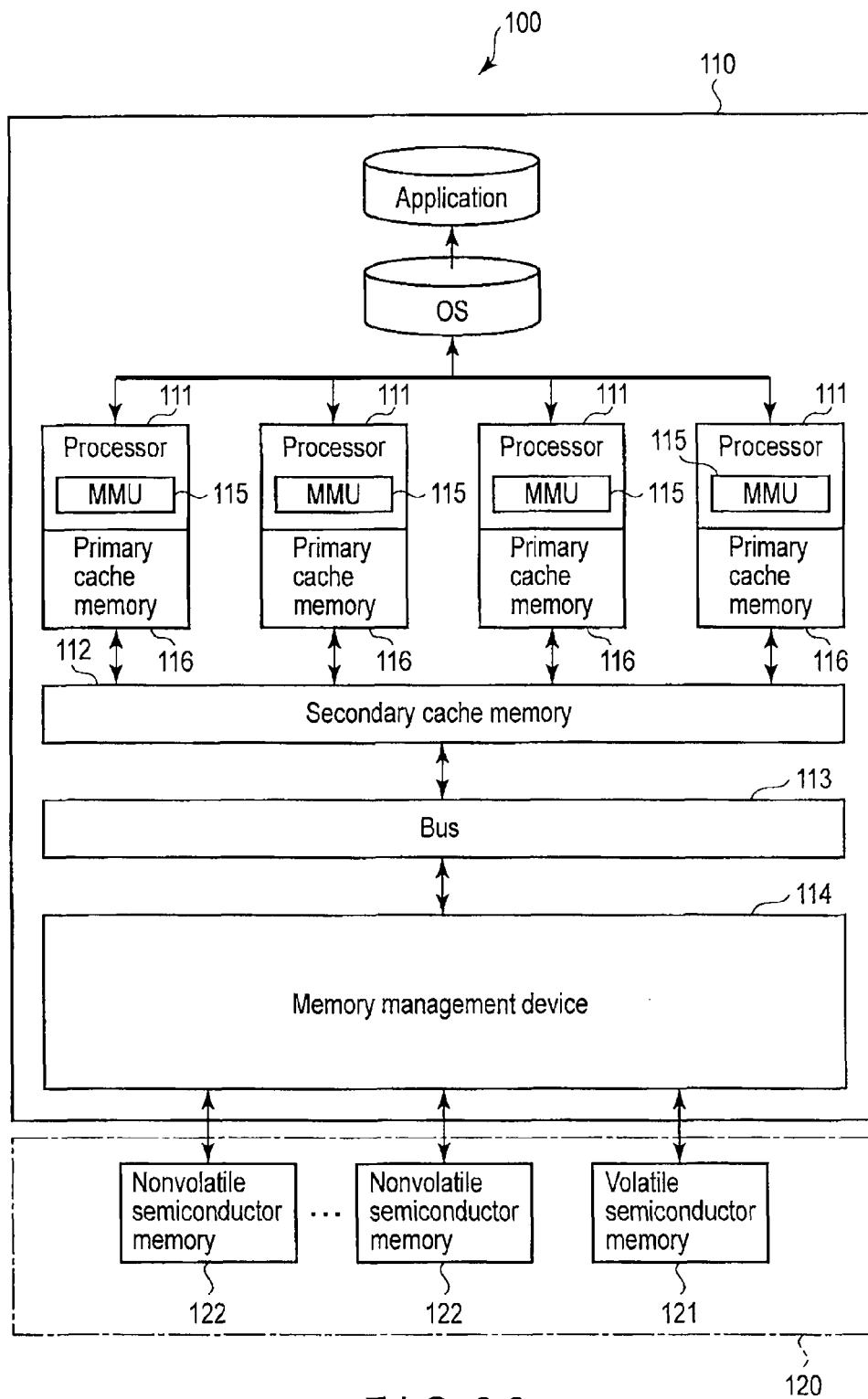
F I G. 2 2

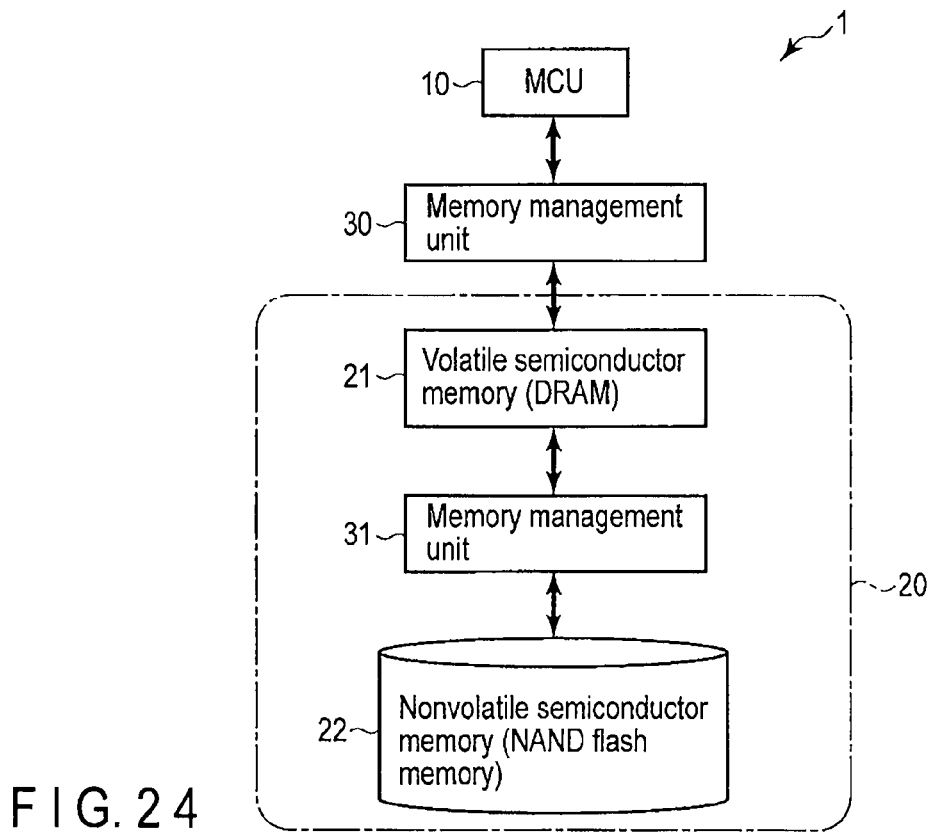
F I G. 24
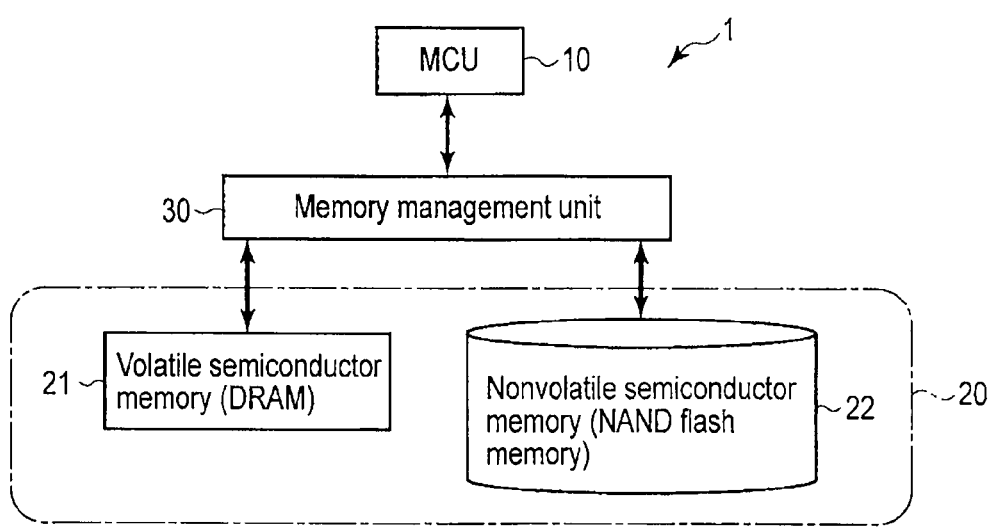
F I G. 25

SEMICONDUCTOR DEVICE AND MEMORY PROTECTION METHOD

CROSS-REFERENCE TO RELATED APPLICATIONS

This application is based upon and claims the benefit of priority from prior Japanese Patent Application No. 2011-033719, filed Feb. 18, 2011, the entire contents of which are incorporated herein by reference.

FIELD

Embodiments described herein relate generally to a semiconductor device and memory protection method.

BACKGROUND

Conventionally, a technique called single-level store is known. This is a memory management technique which manages storage devices as one address space without distinguishing a main storage device and auxiliary storage device.

In such single-level store technique, when a plurality of processes are executed, a technique for protecting information required for one process from another process is important.

BRIEF DESCRIPTION OF THE DRAWINGS

FIG. 8 is a conceptual view of an address space of the semiconductor device according to the first embodiment;

FIGS. 10 and 11 are conceptual views of address spaces of the semiconductor device according to the first embodiment;

FIGS. 12 and 13 are conceptual views of page tables according to the first embodiment;

FIG. 17 is a conceptual view of a page table according to the second embodiment;

FIG. 22 is a block diagram of a semiconductor device according to the fourth embodiment;

FIGS. 24 and 25 are block diagrams of a semiconductor device according to a modification of the first to fourth embodiments.

DETAILED DESCRIPTION

In general, according to one embodiment, a semiconductor device includes: a processor; and a memory device. The memory device has a nonvolatile semiconductor storage device and is configured to serve as a main memory for the processor. When the processor executes a plurality of programs, the processor manages pieces of information required to execute the programs as worksets for the respective programs, and creates tables, which hold relationships between pieces of information required for the respective worksets and addresses of the pieces of information in the memory device, for the respective worksets. The processor accesses to the memory device with reference to the corresponding tables for the respective worksets.

First Embodiment

A semiconductor device and memory protection method according to the first embodiment will be described below.

1. Arrangement of Semiconductor Device

Figure 1:
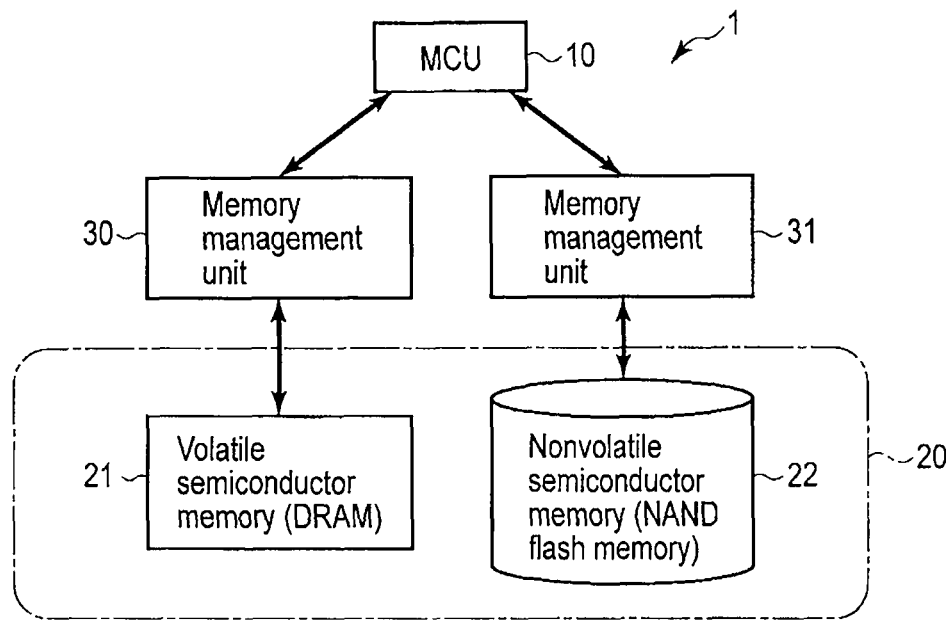
FIG. 1 is a block diagram of a semiconductor device according to the first embodiment.

FIG. 1 is a block diagram of a semiconductor device according to this embodiment. As shown in FIG. 1, a semiconductor device 1 includes a processor (MCU: Micro Controller Unit) 10, a memory device 20, and MMUs (Memory Managing Units) 30 and 31. In the embodiment, the processor 10, memory device 20 and MMUs 30 and 31 need not constitute one device. For example, the structural elements other than the memory device 20, namely the processor 10 and the MMUs 30 and 31, may be formed as a minimum unit made of a single semiconductor device. To be more specific, the processor 10 and MMUs 30 and 31 may be formed as one semiconductor chip, and the memory device 20 may be formed as another semiconductor chip. As can be seen from this, the number of units constituting one device can be arbitrarily determined.

The MCU 10 executes various kinds of processing using data held in the memory device 20.

The memory device 20 includes a volatile semiconductor memory (for example, a Dynamic random-access memory (DRAM) in this example) 21 and nonvolatile semiconductor memory (for example, a NAND flash memory in this example) 22. The DRAM 21 functions as a cache memory of the NAND flash memory 22. The memory device 20 holds various programs such as an OS (Operating System) and applications, and data. The DRAM 21 and NAND flash memory 22 are managed by the single-level store technique. Therefore, when viewed from the MCU 10, the memory device 20 has no distinction of the DRAM 21 and NAND flash memory 22.

The MMUs 30 and 31 access the memory device 20 in response to a request from the MCU 10 by the assistance of the OS. Then, the MMUs 30 and 31 read out data from the memory device 20, and write data in the memory device 20. The MMU 30 assumes access control for the DRAM 21, and the MMU 31 assumes access control for the NAND flash memory 22. That is, when required data is cached from the NAND flash memory 22 onto the DRAM 21, the MCU 10 issues data read and write requests to the MMU 30. In this case, the MMU 30 converts a logical address received from the MCU 10 to execute read and write accesses of the required data to the DRAM 21. On the other hand, when required data is not cached on the DRAM 21, the MCU 10 issues data read and write requests to the MMU 31. In this case, the MMU 31 converts a logical address received from the MCU 10, and executes read and write accesses of the required data to the NAND flash memory 22. Whether or not the required data is cached on the DRAM 21 can be decided by, for example, the OS.

In this manner, the MCU 10 executes the OS read out via the MMUs 30 and 31, and executes various applications on this OS.

Figure 2:
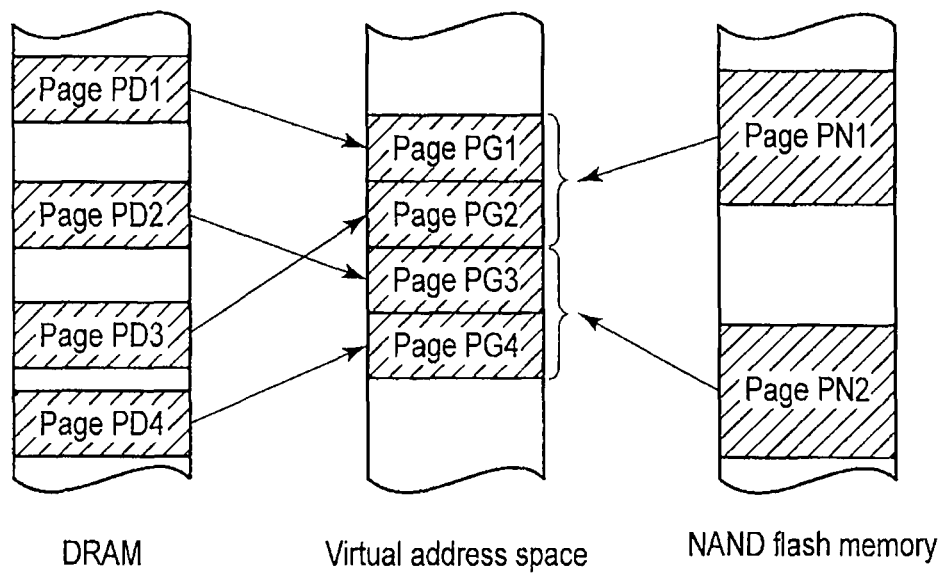
FIGS. 2, 3, and 4 are conceptual views of address spaces of the semiconductor device according to the first embodiment.

FIG. 2 is a conceptual view of an address space of the memory device 20 when viewed from the MCU 10 and those of the DRAM 21 and NAND flash memory 22. The address space of the memory device 20 is visible from the MCU 10 as one address space by a virtual storage function. This address space will be referred to as a virtual address space hereinafter. Each address space is managed by page units as memory areas each having a given size.

FIG. 2 exemplifies a certain file A in the memory device 20. As shown in FIG. 2, assume that the file A is stored in pages PN1 and PN2 in the NAND flash memory 22. These pages PN1 and PN2 are associated with, for example, pages PG1 to PG4 on the virtual address space. As shown in FIG. 2, the order of pages on the NAND flash memory 22 may be different from that on the virtual address space.

When the MCU 10 requires this file A, data of the pages PN1 and PN2 on the NAND flash memory are read out onto the DRAM 21 which functions as a cache memory. In this example, the data of the page PN1 is stored in pages PD1 and PD3 on the DRAM 21, and the data of the page PN2 is stored in pages PD2 and PD4 on the DRAM 21. The pages PD1 to PD4 on the DRAM 21 are respectively associated with the pages PG1, PG3, PG2, and PG4 on the virtual address space.

In this manner, when data in the NAND flash memory 22 are cached on the DRAM 21, the data on the NAND flash memory 22 and those on the DRAM 21 are allocated on the identical virtual address space to share some virtual addresses.

In general, the size of the NAND flash memory 22 is larger than that of the DRAM 21. Therefore, only some data on the NAND flash memory 22 are cached on the DRAM 21. However, although not shown in FIG. 2, a page PN which is not cached on the DRAM 21, is also associated with an arbitrary page PG on the virtual address space.

Then, when the MCU 10 executes read accesses to the pages PG1 to PG4 on the virtual address space, the MMU 30 reads out the file A from the DRAM 21.

Accesses between the MCU 10, and the DRAM 21 and NAND flash memory are controlled by the MMUs 30 and 31, and the MCU 10 need only recognize virtual addresses. In this case, the MMUs 30 and 31 manage the virtual address space using certain page units, as described above. Then, to attain this management, the MMUs 30 and 31 use a page table PT as a table which has a correspondence relationship among pages on the virtual address space, physical addresses of the DRAM 21, and those of the NAND flash memory 22 (those of pages PN). The page table PT has information associated with access control for respective pages on the virtual address space. Based on this information, the MMUs 30 and 31 permit or inhibit accesses from the MCU 10 to the memory device 20. The page table PT is stored in, for example, the NAND flash memory 22, and some data of the page table PT are cached on, for example, the DRAM 21, so as to allow the MMUs 30 and 31 to use those data. Alternatively, some data of the page table PT may be further cached on, for example, storage devices such as registers in the MMUs 30 and 31.

Figure 3:
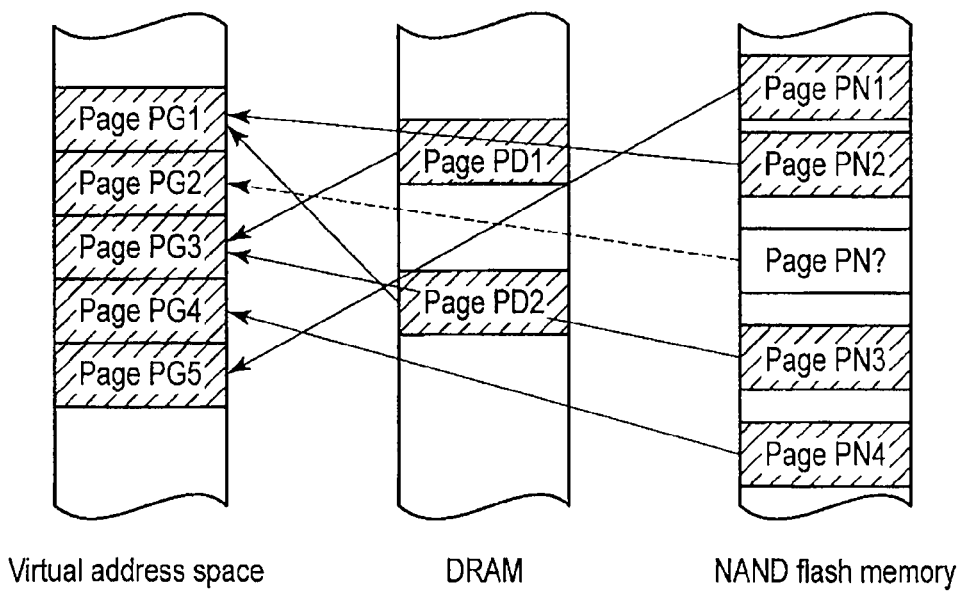

FIG. 3 is another conceptual view showing the relationship between the virtual address space and the address spaces of the DRAM 21 and NAND flash memory 22.

Respective pages of the DRAM 21 and NAND flash memory 22 are associated with the virtual address space, as shown in FIG. 3. In this case, a certain page PN on the NAND flash memory 22 is associated with a page PG2 on the virtual address space, but that page PN may not be settled yet in some cases. When the MCU 10 requires this data, the MMUs 30 and 31 recognize their correspondence relationship.

Figure 4:
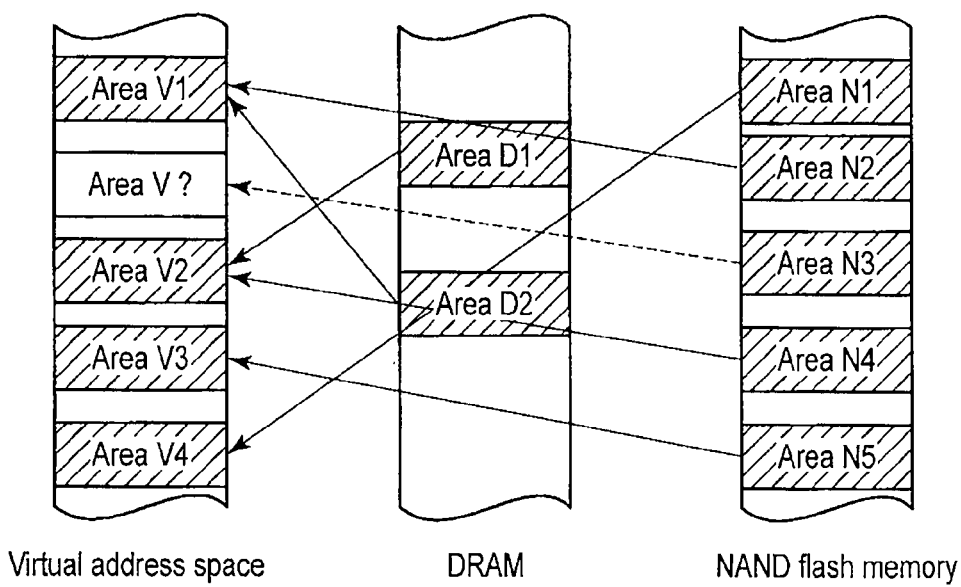

FIG. 4 shows another example. In FIG. 4, the address spaces are managed using units of arbitrary groups (indicated by "area" in FIG. 4) of data. When viewed in data units in this way, virtual addresses of these data are often discontinuous.

2. Operation of Semiconductor Device 1

Figure 5:
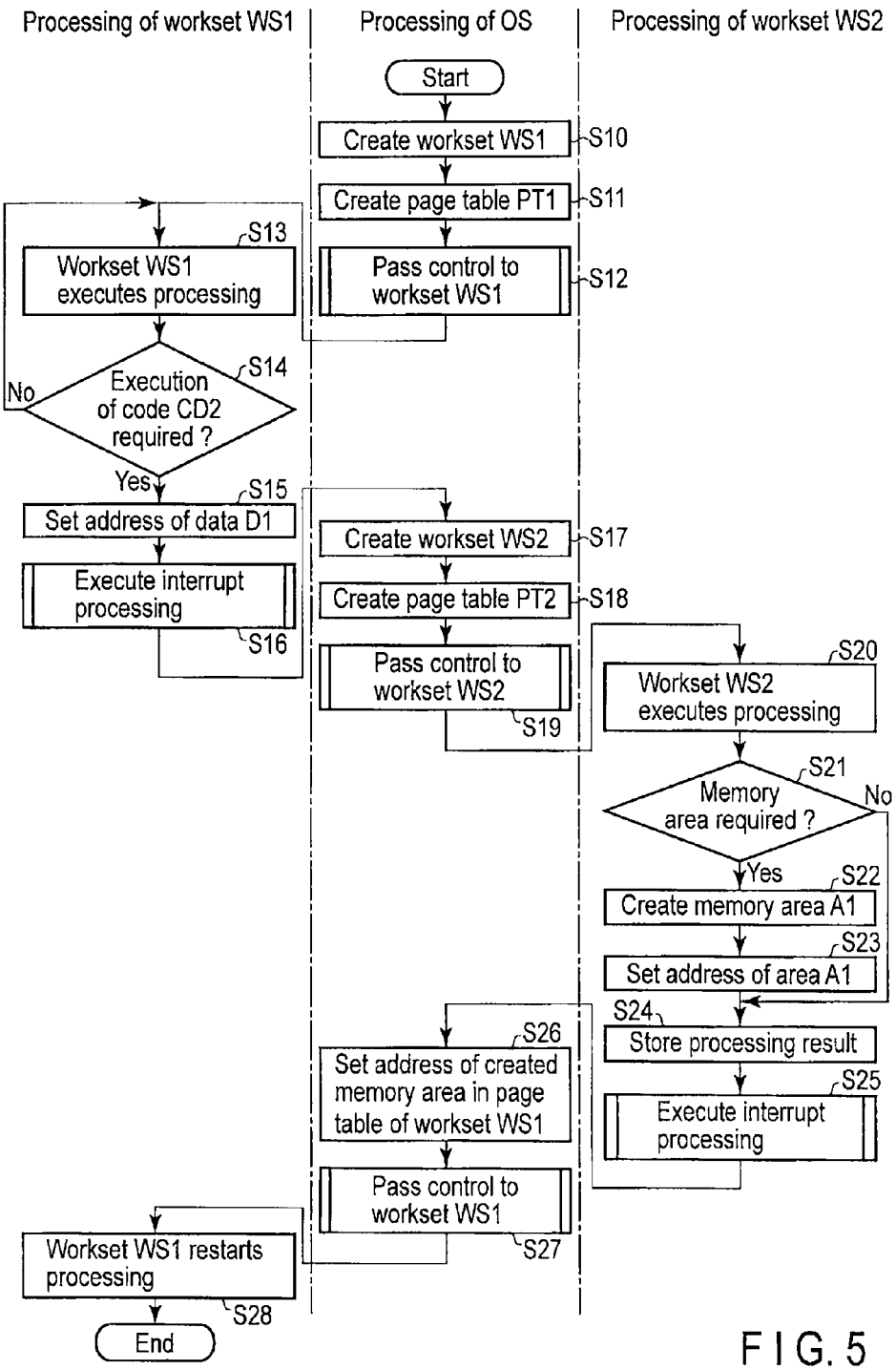
FIG. 5 is a flowchart showing the operation of the semiconductor device according to the first embodiment.

The operation of the semiconductor device 1 with the above arrangement will be described below with reference to FIG. 5. FIG. 5 is a flowchart showing the sequence of the operation of the semiconductor device 1 when the MCU 10 executes a certain program code CD1, and executes another program code CD2 during the execution process of the program code CD1.

<Processing of OS>

Initially, the OS executes processing. Needless to say, the processing by the OS is executed on the MCU 10 in practice. As shown in FIG. 5, the OS which is running on the MCU 10 creates a workset WS1 to execute the code CD1 (step S10). A workset is a set of all pieces of information and memory areas required for a certain program to run. For example, upon consideration of a case in which a code which makes arithmetic operation using certain data is to be executed, a workset includes the code itself, data required for the arithmetic operation, and a memory space required to store an arithmetic operation result.

Furthermore, the OS creates a page table PT1 of the workset WS1 (step S11). The OS stores this page table PT1 in the NAND flash memory 22, and also in the DRAM 21 and MMU 30. As described above, the page table is a table which indicates the relationship between the virtual address space shown in FIG. 2 and physical addresses of the DRAM 21 and NAND flash memory 22.

Upon completion of creation of the workset WS1 and page table PT1, the OS passes the control to the workset WS1 (step S12).

<Processing of Workset WS1>

After step S12, the process transits to the workset WS1. The workset WS1 executes the program code CD1 and executes processing (step S13). This processing is also executed on the MCU 10 in practice. In operation by the workset WS1, MMU 30 refers to the page table PT1 to access to information required for the workset WS1. Assume that in the workset WS1, execution of the program code CD2 which is not included in the workset WS1 (that is, which is not included in the page table PT1) is required (YES in step S14). Then, the workset WS1 executes an external call instruction.

More specifically, the workset WS1 sets an address of data D1 required to execute the code CD2 (step S15), and executes interrupt processing (step S16). That is, the workset WS1 recognizes mere existence of the code CD2, but does not recognize its location. Hence, the workset WS1 issues an execution request of the code CD2 to the OS.

<Processing of OS>

In response to the interrupt processing in step S16, the process transits to the OS. The OS creates a workset WS2 required to execute the code CD2 (step S17). Subsequently, the OS creates a page table PT2 of the workset WS2 (step S18), and stores it in the NAND flash memory 22 and also in the DRAM 21 and MMU 30.

After creation of the workset WS2 and page table PT2, the OS passes the control to the workset WS2 (step S19).

<Processing of Workset WS2>

After step S19, the process transits to the workset WS2. More specifically, the workset WS2 executes the program code CD2, and executes processing using the data D1 (step S20). This processing is also executed on the MCU 10. The MMUs 30 and 31 refer to the page table PT2 in place of the page table PT1 to access to information required for the workset WS2. If the workset WS2 requires a new memory area for the purpose of, for example, storage of an arithmetic operation result (YES in step S21), it reserves a new memory area A1 (step S22), and sets physical addresses of the reserved area A1 in the page table PT2 (step S23). Then, the workset WS2 can use the new area A1.

After that, upon completion of the processing, the workset WS2 stores the processing result in the memory area A1 (step S24). The area used to store the result may be the area where the data D1 is stored if possible in place of the memory area A1.

Then, the workset WS2 executes interrupt processing to return the process to the workset WS1 (step S25).

<Processing of OS>

In response to the interrupt processing in step S25, the process transits to the OS. The OS sets physical addresses of the memory area A1 reserved in step S22 in the page table PT1 of the workset WS1 (step S26). Then, the OS passes the control to the workset WS1 (step S27).

<Processing of Workset WS1>

As a result of step S27, the control returns to the workset WS1. That is, an external call instruction ends. Then, the workset WS1 restarts the processing using the page table PT1 (step S28). At this time, the page table PT1 has already been updated in step S26. Therefore, the workset WS1 can execute the processing using the processing result of the workset WS2, which is stored in step S24 (step S28).

3. Specific Example of Operation of Semiconductor Device 1

The operation which has been described using FIG. 5 will be specifically described below with reference to changes of the virtual address space and page tables PT.

Figures 6, 7:
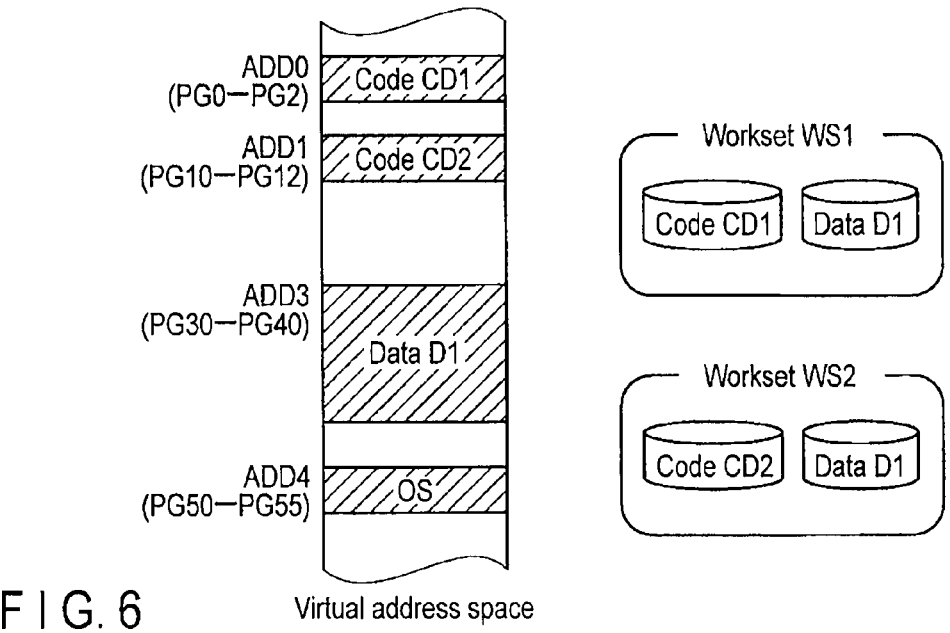
FIG. 6 is a conceptual view of an address space of the semiconductor device according to the first embodiment.
FIG. 7 is a conceptual view of a page table according to the first embodiment.

FIG. 6 is a conceptual view of the virtual address space of the memory device 20 and the worksets WS1 and WS2. A case will be assumed wherein the code CD1 is stored in pages PG0 to PG2 starting from a virtual address ADD0, the code CD2 is stored in pages PG10 to PG12 starting from a virtual address ADD1, the data D1 is stored in pages PG30 to PG40 starting from a virtual address ADD3, and the OS is stored in pages PG50 to PG55 starting from a virtual address ADD4, as shown in FIG. 6.

<Steps S10 to S16>

Steps S10 to S16 of FIG. 5 will be described first. FIG. 7 is a conceptual view of the page table PT1 created in step S11.

As shown in FIG. 7, the page table PT1 has a plurality of entries, and respective pages on the virtual address space are associated with respective entries of the page table PT1. In FIG. 7, "PG" is described beside each entry, and this describes a page corresponding to that entry just for information. Then, each entry stores a corresponding physical address on the virtual address space. Also, each entry includes a write flag W and valid flag V.

The flag V is information indicating whether a page corresponding to an entry of interest is valid or invalid: the page is valid when V=1; it is invalid when V=0. The workset WS1 cannot refer to an invalid page. The flag W is information indicating whether or not a write access (overwrite access of data) to a page corresponding to an entry of interest is permitted: the write access is permitted when W=1; it is inhibited when W=0. Therefore, the workset WS1 can execute both read and write accesses to a page corresponding to an entry in which V=1 and W=1 are set. On the other hand, the workset WS1 can execute a read access to a page corresponding to an entry in which V=1 and W=0 are set, but a write access to that page is inhibited. For a page corresponding to an entry in which V=0 is set, neither of read and write accesses are inhibited, and the workset WS1 cannot recognize existence of that page at all.

As for the aforementioned basic configuration of the page table, the same applies to the page table PT2.

The workset WS1 is a set of the code CD1 and data D1. Therefore, the page table PT1 is as shown in FIG. 7. That is, physical addresses of the code CD1 are stored in entries corresponding to the pages PG0 to PG2, and the flag V=1 is set. When the code CD1 is inhibited from being rewritten, the flag W=0 is set. Furthermore, physical addresses of the data D1 are stored in entries corresponding to the pages PG30 to PG40, and the flags V=1 and W=1 are set. Therefore, the workset WS1 can overwrite the data D1. Also, no physical addresses are stored in entries corresponding to the pages PG10 to PG12 (code CD2), and the flags V=0 and W=0 are set. In addition, no physical addresses are set in entries corresponding to information which is not included in the workset WS1, and V=0 and W=0 are set. Note that physical addresses of the OS (which are not shown in FIG. 7) are also set in the page table PT1, and V=1 and W=0 are set for these entries.

As a result, the workset WS1 recognizes the virtual address space, which is as shown in FIG. 6 in practice, as shown in FIG. 8. FIG. 8 is a conceptual view of the virtual address space when viewed from the workset WS1.

As shown in FIG. 8, the workset WS1 can recognize the presence of the code CD1, data D1, and OS. However, the code CD2 is invisible from the workset WS1, which cannot access the code CD2. This is because the page table PT1 does not store any physical addresses of the code CD2, and the flag V=0 is set.

In steps S13 to S15, the workset WS1 executes the processing with reference to the page table PT1 shown in FIG. 7. In other words, the MMUs 30 and 31 access the memory device 20 based on the page table PT1 shown in FIG. 7. The address set in step S15 includes physical addresses stored in entries corresponding to the pages PG30 to PG40 in the page table PT1.

<Steps S17 to S20>

Figure 9:
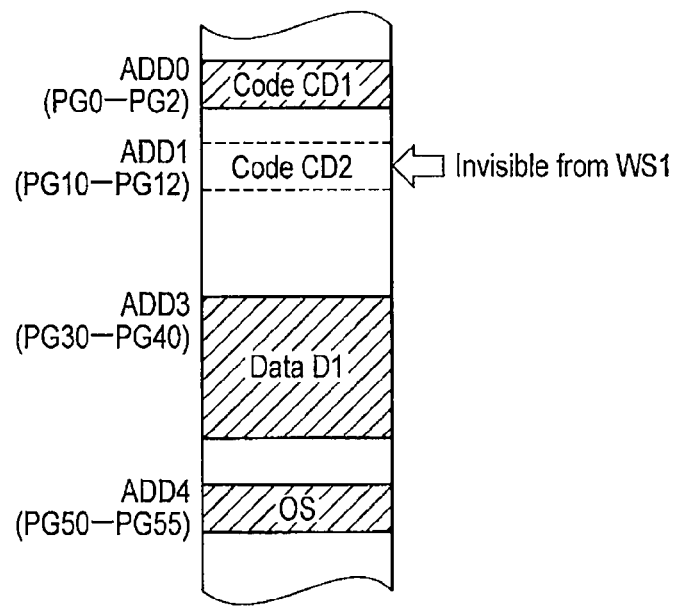
FIG. 9 is a conceptual view of a page table according to the first embodiment.

Steps S17 to S20 in FIG. 5 will be described below. FIG. 9 is a conceptual view of the page table PT2 created in step S18.

The workset WS2 is a set of the code CD2 and data D1. Therefore, the page table PT2 is as shown in FIG. 9. That is, physical addresses of the code CD2 are stored in entries corresponding to the pages PG10 to PG12, and the flag V=1 is set. If the code CD2 is inhibited from being rewritten, the flag W=0 is set. Furthermore, physical addresses of the data D1 are stored in entries corresponding to the pages PG30 to PG40, and the flags V=1 and W=1 are set. Therefore, the workset WS2 can overwrite the data D1. No physical addresses are stored in entries corresponding to the pages PG0 to PG2, and the flag V=0 and flag W=0 are set. In addition, no physical addresses are set in entries corresponding to areas which are not included in the workset WS2, and V=0 and W=0 are set. Note that although not shown, physical addresses of the OS are also set in the page table PT2 as in the page table PT1, and V=1 and W=0 are set for these entries.

As a result, the workset WS2 recognizes the virtual address space, which is as shown in FIG. 6 in practice, as shown in FIG. 10. FIG. 10 is a conceptual view of the virtual address space when viewed from the workset WS2.

As shown in FIG. 10, the workset WS2 can recognize the presence of the code CD2, data D1, and OS. However, the code CD1 is invisible from the workset WS2, which cannot access the code CD1. This is because no physical addresses of the code CD1 are stored in the page table PT2, and the flag V=0 is also set.

In step S20, the workset WS2 executes the processing with reference to the page table PT2 shown in FIG. 9. In other words, the MMUs 30 and 31 access the memory device 20 based on the page table PT2 shown in FIG. 9.

<Steps S21 to S24>

The processes in steps S22 and S23 after it is determined in step S21 that a new memory area is required will be described below with reference to FIGS. 11 and 12. FIG. 11 is a conceptual view of the virtual address space when viewed from the workset WS2, and FIG. 12 is a conceptual view of the page table PT2 updated in step S23.

Assume that the workset WS2 reserves pages PG20 to PG22 starting from a virtual address ADD2, as shown in FIG. 11. Then, the workset WS2 updates the page table PT2, as shown in FIG. 12. That is, physical addresses of the area A1 are stored in entries corresponding to the pages PG20 to PG22, and the flags V=1 and W=1 are set. Then, the workset WS2 can freely use the area A1. In other words, the MMUs 30 and 31 can store data in and can read out data from the pages PG20 to PG22.

Note that since the area A1 is not registered in the page table PT1 at the current timing, the area A1 is invisible from the workset WS1.

<Steps S25 to S28>

Steps S25 to S28 will be described below. When the control transits to the OS in response to the interrupt processing in step S25, the OS updates the page table PT1, as shown in FIG. 13. FIG. 13 is a conceptual view of the page table PT1.

As shown in FIG. 13, the OS stores the physical addresses of the area A1 in entries corresponding to pages PG20 to PG22 on the page table PT1, and sets the flags V=1 and W=1 (or 0). Thus, the workset WS1 can also free use the area A1.

Figure 14:
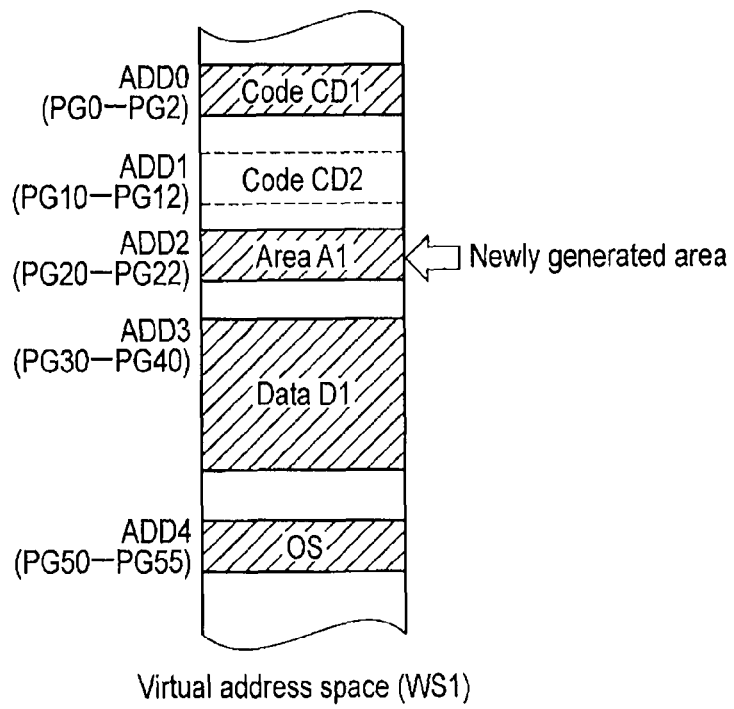
FIG. 14 is a conceptual view of an address space of the semiconductor device according to the first embodiment.

That is, after the page table PT1 is updated to the state shown in FIG. 13, the virtual address space visible from the workset WS1 is as shown in FIG. 14. As shown in FIG. 14, the workset WS1 can also access the area A1. Hence, the workset WS1 continues the processing using not only the data D1 but also the area A1 (step S28).

4. Effects According to this Embodiment

As described above, the configuration according to this embodiment can effectively protect information. Effects will be described below.

When a plurality of processes are executed in the conventional single-level store technique, one process (process PC1) may destroy information of the other process (PC2). This is because since an address space is managed using logical addresses common to the plurality of processes PC1 and PC2, information required for the process PC2 is unwantedly visible from the process PC1.

Hence, a method of assigning logical addresses for respective processes is known. In this case, an address space of the process PC2 is invisible from the process PC1, and vice versa. Only the OS is visible from both the processes PC1 and PC2. Therefore, information can be prevented from being mutually destroyed. However, in this case, troublesome processes are required when these processes want to refer to common data. That is, when data possessed by the process PC1 is to be passed to the process PC2, that data is invisible from the process PC2 in this state. Therefore, the process PC1 copies that data to the OS. Next, the OS copies that data to the process PC2. As a result, the process PC2 can refer to that data, but two data copy processes are required.

In this manner, when the address space is to be managed using common logical addresses, it is difficult to protect data. When data is to be protected, address spaces have to be switched for respective processes.

However, the configuration according to this embodiment can solve the aforementioned problem. More specifically, a single address system which does not switch address spaces (the same contents are always visible at the same addresses, and other contents are always visible at different addresses) is adopted, and data can also be effectively protected.

That is, in this embodiment, the OS manages the virtual memory for respective pages, and manages a group of pages as a workset WS. Furthermore, the OS manages authority for accessing data of respective worksets WS. More specifically, the OS prepares a page table PT for each workset WS, and manages the authority using this table.

Thus, the worksets WS can refer to information each other using logical addresses (virtual addresses). When the control transits to another workset WS, the OS also switches the page table PT. In this case, the OS updates the page table PT to permit that workset WS to refer to new information.

A specific example will be described below. A situation will be considered below wherein the workset WS1 has the page table PT1 shown in FIG. 7, and the workset WS2 has the page table PT2 shown in FIG. 9 in the above embodiment. Then, the code CD2 is invisible from the workset WS1 since the flag V=0 is set. Hence, the code CD2 can be prevented from being destroyed by the workset WS1, and vice versa. That is, the code CD1 is invisible from the workset WS2. Hence, the code CD1 can be prevented from being destroyed by the workset WS2.

On the other hand, the flag V of entries associated with the data D1 in the page tables PT1 and PT2 is set to be "1". Therefore, both the worksets WS1 and WS2 can refer to the data D1 without requiring any data copy.

As has been described above using FIGS. 11, 12, 13, and 14, each page table PT can be updated as needed. That is, when new data (for example, the area A1 in FIG. 11) created by the workset WS2 is to be also used by the workset WS1, the page table PT1 is updated, as shown in FIG. 13. That is, the flag V of an area corresponding to the area A1 in the page table PT1 is set to be "1". As a result, not only the workset WS2 but also the workset WS1 can access the area A1.

In this manner, the worksets WS can easily exchange data, while important information can be prevented from being destroyed.

Second Embodiment

A semiconductor device and memory protection method according to the second embodiment will be described below. This embodiment relates to a method of allowing a workset to refer to and add new data in the first embodiment. Since other configurations and operations are the same as those in the first embodiment, a description thereof will not be repeated.

1. Reference of Data

Figure 15:
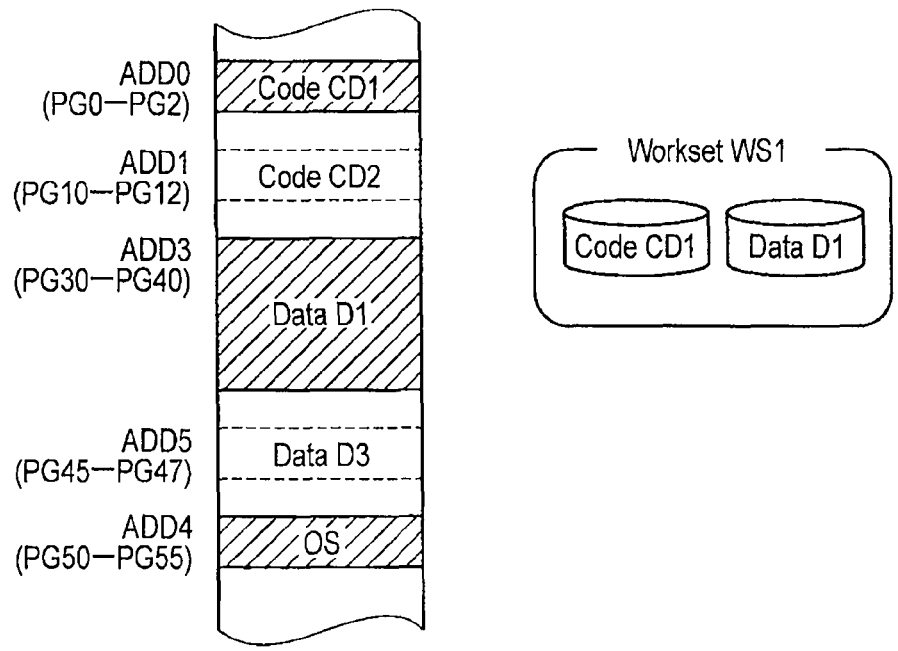
FIG. 15 is a conceptual view of an address space of a semiconductor device according to the second embodiment.

A new data reference method will be described first. FIG. 15 is a conceptual view of a virtual address space when viewed from a workset WS1.

As shown in FIG. 15, the workset WS1 is a set of a code CD1 and data D1, as has been described in the first embodiment. Assume that a memory device 20 stores data D3, which is not included in the workset WS1, in pages PG45 to PG47 starting from a virtual address ADD5. A case will be considered below wherein the workset WS1 requires the data D3 in such situation.

Figure 16:
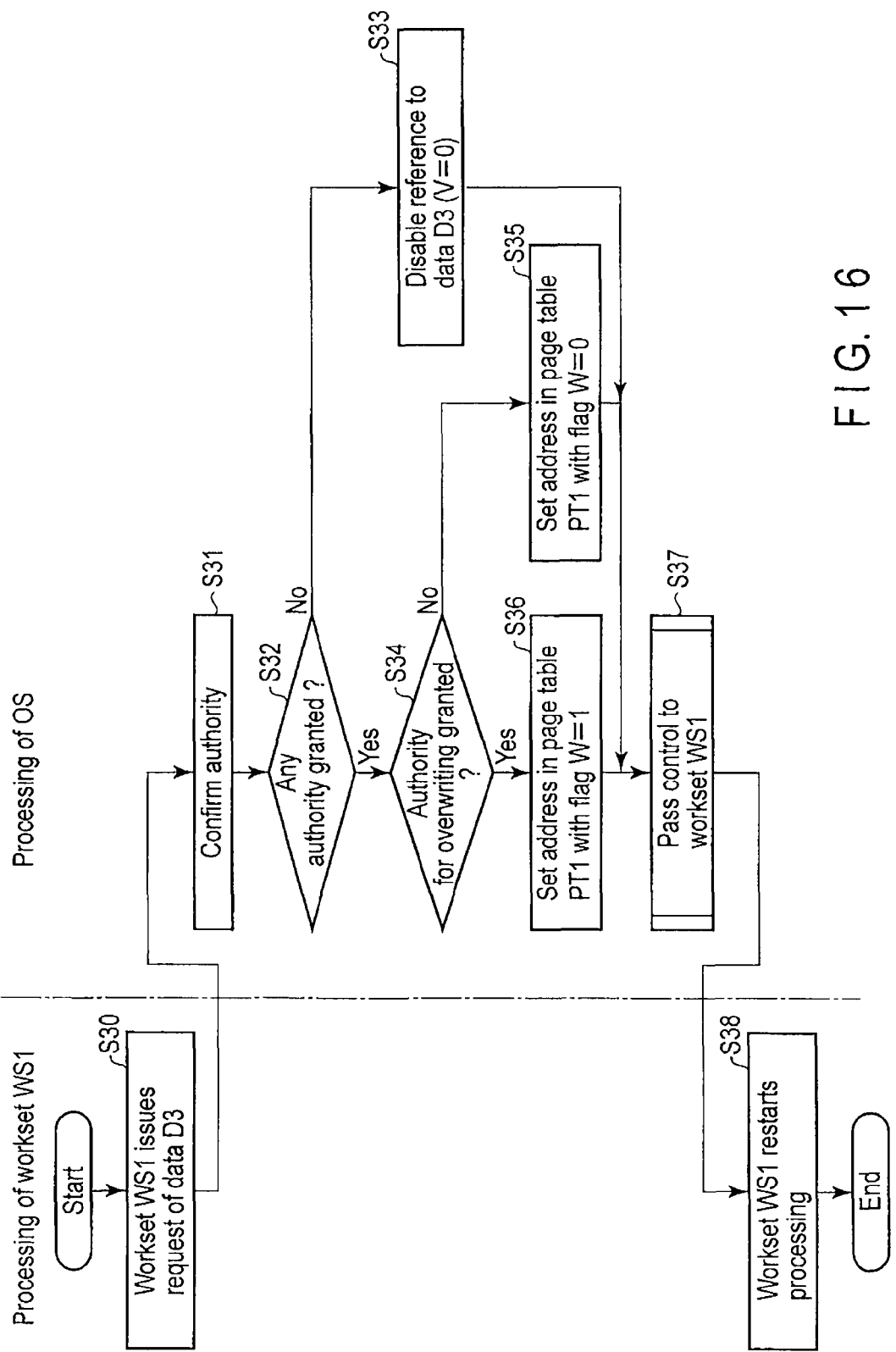
FIG. 16 is a flowchart showing the operation of the semiconductor device according to the second embodiment.

FIG. 16 is a flowchart showing the sequence of the operation of a semiconductor device 1 in the aforementioned case. As shown in FIG. 16, the workset WS1 (in other words, MMUs 30 and 31), which requires the data D3, recognizes existence of that data, but it recognizes neither a location nor a size of that data, and issues a reference request of the data D3 to the OS (step S30).

In response to this request, the OS confirms an authority for accessing data D3 of the user of the workset WS1 (or the workset WS1 itself) (step S31). If the user is granted neither authority for reading the data D3 nor authority for overwriting the data D3 (NO in step S32), the OS inhibits the workset WS1 from referring to the data D3 (step S33). That is, the page table PT1 is not updated.

If the user is granted the authority for reading but is not granted the authority for overwriting (YES in step S32, NO in step S34), the OS updates the page table PT1. That is, the OS sets physical addresses of the data D3 in entries corresponding to the pages PG45 to PG47, and sets flags V=1 and W=0 (step S35). Then, the workset WS1 is permitted to execute only read accesses to the data D3.

On the other hand, if the user is granted the authority for reading and overwriting (YES in step S32, YES in step S34), the OS updates the page table PT1. In this case, the OS sets physical addresses of the data D3 in entries corresponding to the pages PG45 to PG47, and sets flags V=1 and W=1 (step S36). Then, the workset WS1 is permitted to execute not only read accesses but also write accesses to the data D3.

FIG. 17 shows a state of the page table PT1 updated in step S35 or S36. FIG. 17 is a conceptual view of the page table PT1. As shown in FIG. 17, when the user has authority, the physical addresses of the data D3 are assigned to the page table PT1. The value of the write flag W depends on the authority granted to that user.

After that, the OS returns the control to the workset WS1 (step S37), and the workset WS1 restarts processing (step S38).

2. Addition of Data

A new data addition method will be described below. For example, a case will be considered below wherein the workset WS1 requires new data D4 which is not held in the memory device 20 in the situation in FIG. 16.

Figure 18:
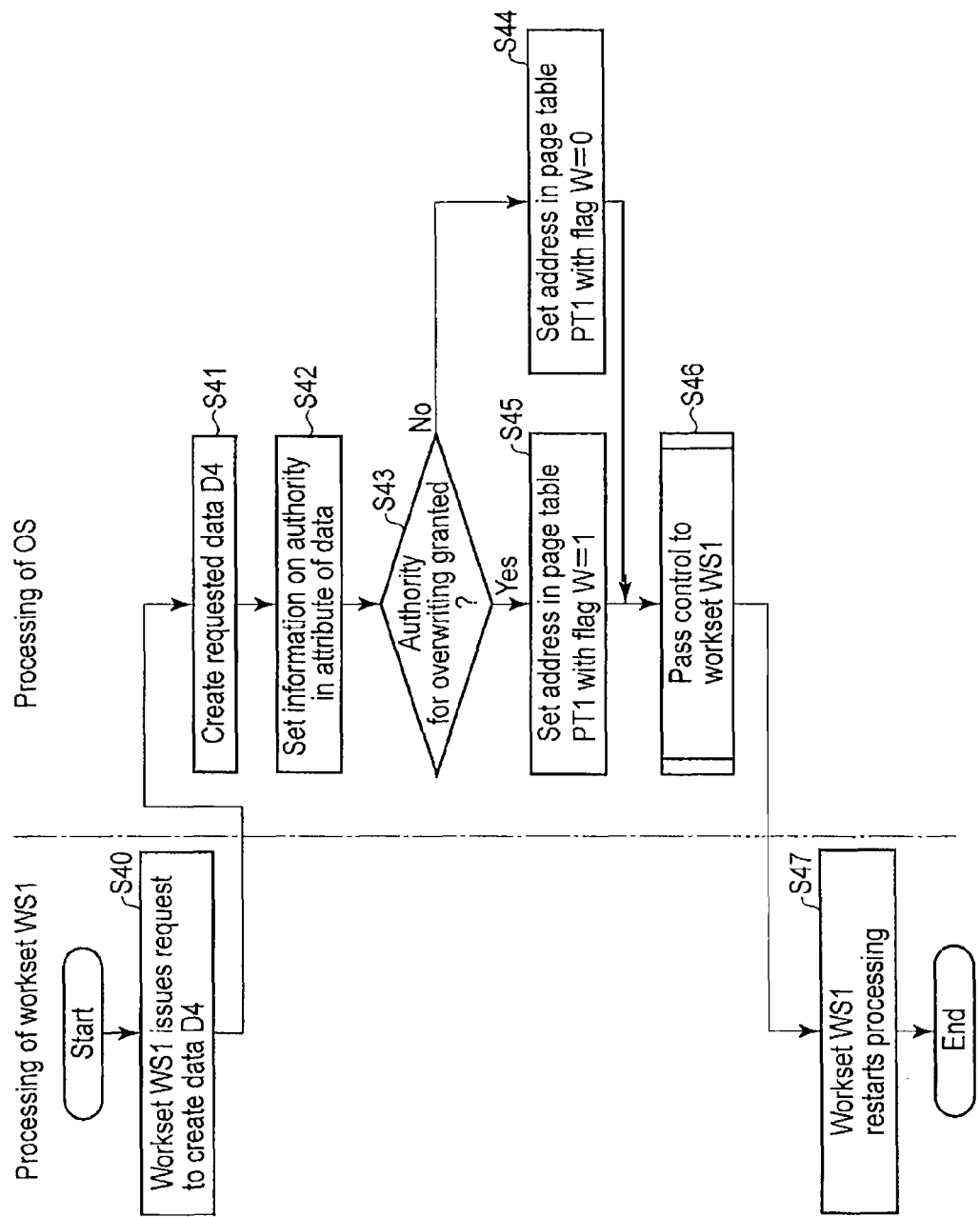
FIG. 18 is a flowchart showing the operation of the semiconductor device according to the second embodiment.

FIG. 18 is a flowchart showing the sequence of the operation of the semiconductor device 1. As shown in FIG. 18, the workset WS1, which requires the data D4, issues a creation request of the data D4 to the OS (step S40).

In response to this request, the OS creates the data D4 (step S41). Then, the OS sets information on authority for accessing the data D4 in attribute information of this data D4 (step S42).

If the user (or the workset WS1 itself) is not granted authority for overwriting (NO in step S43), the OS updates the page table PT1 to set physical addresses of the data D4 in corresponding entries and to set the flags V=1 and W=0 (step S44). Then, the workset WS1 is permitted to execute only read accesses to the data D4.

On the other hand, if the user is granted authority for reading and overwriting (YES in step S43), the OS sets the flags V=1 and W=1 (step S45). Then, the workset WS1 is permitted to execute not only read accesses but also write accesses to the data D4.

After that, the OS returns the control to the workset WS1 (step S46), and the workset WS1 restarts processing (step S47).

3. Extension of Data Area

For example, a case will be considered below wherein a free space of a new area A1 reserved in FIG. 12 becomes insufficient, and that area is required to be extended.

In this case, the worksets WS1 and WS2 can extend the area A1 by a page unit. Page extension can be implemented by assigning physical addresses to corresponding entries in the page tables and setting the flags V=1 and W=1. Of course, when write accesses are to be inhibited, W=0 can be set.

4. Effects According to This Embodiment

With the configuration according to this embodiment, the OS can cope with a case in which new data is to be referred to by a workset, and a case in which new data is created and is to be referred to by a workset. More specifically, the OS updates a page table PT of the target workset WS to allow that workset to refer to the new data.

Therefore, data can be easily provided to each workset WS, and authority for accessing data can be controlled by a simple method.

Third Embodiment

A semiconductor device and memory protection method according to the third embodiment will be described below. This embodiment manages information in a memory device 20 using files and directories like a FAT (File Allocation Table) file system in the first or second embodiment. Since other configurations and operations are the same as those in the first or second embodiment, a description thereof will not be repeated.

1. Management Using Directory Structure

Figure 19:
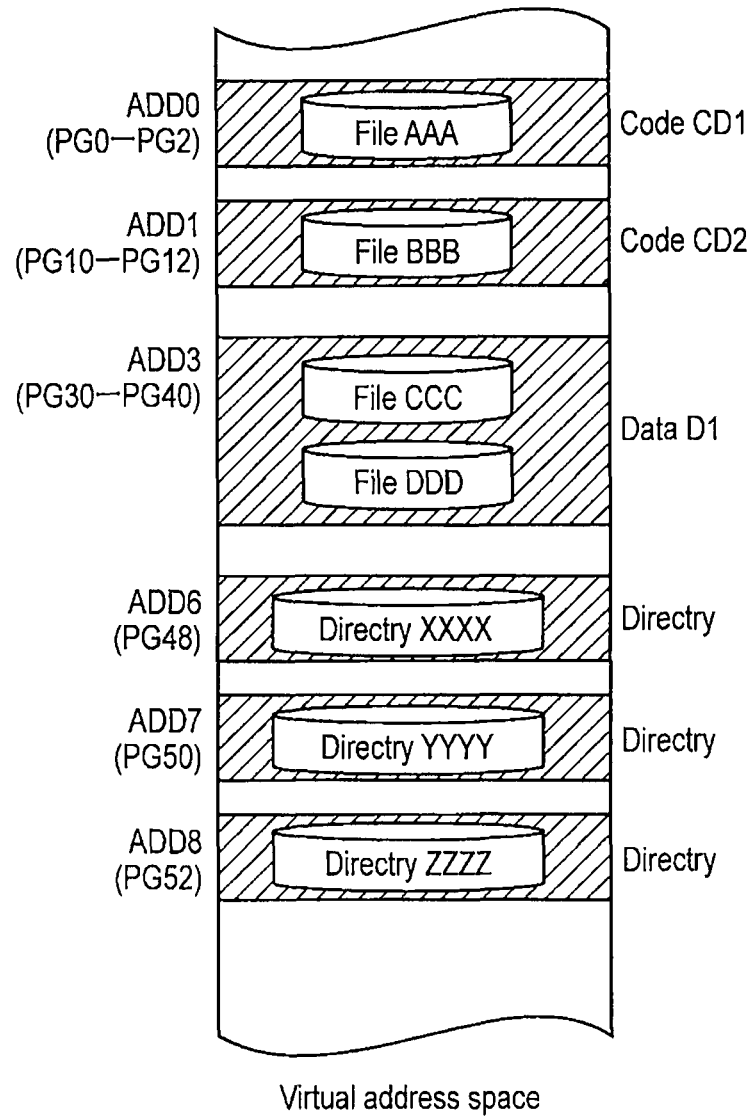
FIG. 19 is a conceptual view of an address space of a semiconductor device according to the third embodiment.

FIG. 19 is a conceptual view of a virtual address space of the memory device 20 according to this embodiment. Assume that a code CD1 is stored in pages PG0 to PG2, a code CD2 is stored in pages PG10 to PG12, and data D1 is stored in pages PG30 to PG40, as shown in FIG. 19.

In this case, an MCU 10 manages the code CD1 as a file AAA, the code CD2 as a file BBB, and the data D1 as two files CCC and DDD. Furthermore, the MCU 10 manages these files using a tree structure shown in FIG. 20.

Figure 20:
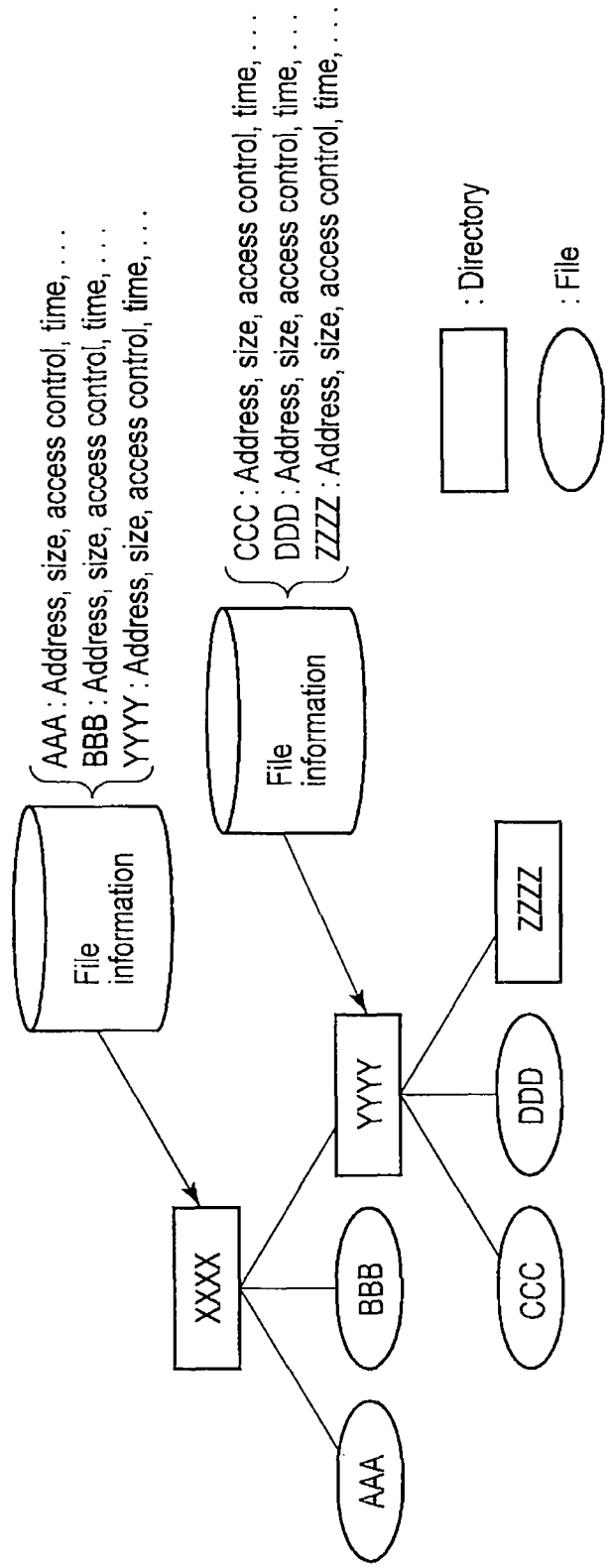
FIG. 20 is a conceptual view showing a data management method according to the third embodiment.

As shown in FIG. 20, the files AAA and BBB are allocated under a root directory XXXX. The files CCC and DDD are allocated under a subdirectory YYYY under the root directory XXXX. Assume that a subdirectory ZZZZ is included under the subdirectory YYYY.

Therefore, the MCU 10 reserves areas for the directories XXXX, YYYY, and ZZZZ on the virtual address space, as shown in FIG. 19. Each area stores information indicating files and/or subdirectories allocated in an associated directory. Furthermore, each directory holds file information of files and/or subdirectories in that directory.

The file information includes, for each file, a virtual address, size, access control information (information as to whether or not read, write, and erase accesses are permitted for each user and/or workset), time of creation, and the like, as shown in FIG. 20.

2. Access Method to File and Directory

Figure 21:
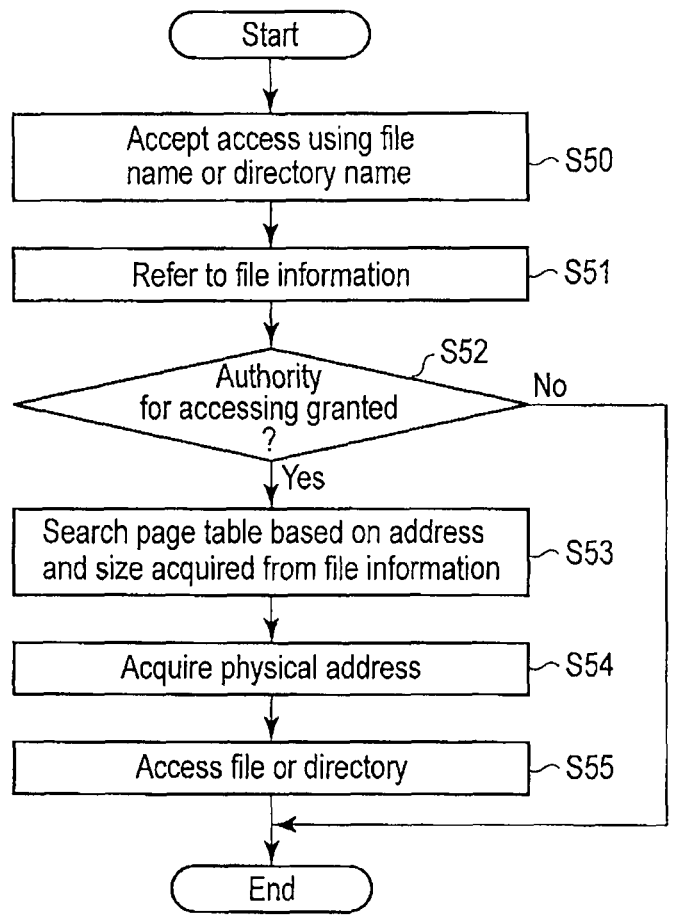
FIG. 21 is a flowchart showing the operation of the semiconductor device according to the third embodiment.

The MCU 10 accepts an access request from the user for each file and directory, and issues an access request to MMUs 30 and 31 for each file and directory. A method for accessing to each file and directory will be described below with reference to FIG. 21. FIG. 21 is a flowchart showing the access method to the memory device 20.

As shown in FIG. 21, an access request using a file name or directory name is accepted from the user (step S50). For example, assume that the file AAA is accessed. Then, the MCU 10 instructs the MMU 30 or 31 to read out file information from the root directory XXXX. Then, the MCU 10 refers to the readout file information (step S51).

As a result of reference to the file information, if the user is not granted authority for accessing (NO in step S52), the processing is aborted. On the other hand, if the user is granted the authority for accessing (YES in step S52), the MCU 10 passes the page addresses PG0 to PG2 to the MMU 30 or 31 based on the virtual address and size information acquired from the file information in step S51, and the MMU 30 or 31 searches a page table PT based on these page addresses PG0 to PG2 (step S53).

The MMU 30 or 31 acquires physical addresses of the file AAA by the search process in step S53 (step S54), and reads out the file AAA from the memory device 20 (step S55).

3. Effects According to This Embodiment

According to this embodiment, even in the configuration which uses a main storage device and auxiliary storage device as a main memory without distinguishing them, the user is allowed to recognize information as a file and/or directory. That is, even in the single-level store technique, the user can handle information in the same manner as in a conventional system which distinguishes a main storage device and auxiliary storage device. Therefore, user's convenience can be improved.

Note that in this embodiment, file information (in other words, a property) is stored in a directory. However, in some case, file information may be allocated in each file (for example, allocated in a leading section in an area which stores the file). However, it is preferable to allocate file information in a directory in terms of security.

Fourth Embodiment

A semiconductor device according to the fourth embodiment will be described below. This embodiment is a specific example of a semiconductor device 1 according to the first to third embodiments.

As shown in FIG. 22, the semiconductor device 1 roughly includes an information processing device 110 and storage device 120, which are connected via, for example, a bus to be able to communicate with each other. The information processing device 110 and storage device 120 may be formed on a single semiconductor substrate or may be formed as separate chips. The storage device 120 includes a plurality of semiconductor memories. In this embodiment, the storage device 120 includes a volatile semiconductor memory semiconductor memory 121 and nonvolatile semiconductor memories 122.

The arrangement of the information processing device 110 will be described first. As shown in FIG. 22, the information processing device 110 includes a plurality of processors 111, secondary cache memory 112, bus 113, and memory management device 114, and is formed by, for example, an SoC (System on Chip).

Each processor 111 includes a primary cache memory 116 and MMU (Memory Management Unit) 115. As the processor 111, for example, a CPU (Central Processing Unit) is used, but other processing units such as an MPU (Micro Processor Unit) and GPU (Graphic Processor Unit) may be used. The number of processors 111 in FIG. 22 is four, but at least one processor 111 need only be arranged. The processors 111 share the secondary cache memory 112, and are electrically connected to the memory management device 114 via the bus 113. Then, the processors 111 access the storage device 120 via the memory management device 111. Furthermore, each processor 111 reads out the OS from the storage device 120, executes it, reads out an application from the storage device 120 or the like, and executes it on the OS.

The memory management device 114 is electrically connected to the volatile semiconductor memory 121 and nonvolatile semiconductor memories 122 in the storage device 120. Then, the memory management device 114 accesses the storage device 120 in response to a request from each processor 111, and reads out data from the storage device 120, or writes data in the storage device 120. The memory management device 114 is operable asynchronously with the processors 111, and can execute processes such as wear leveling, garbage collection, and compaction for the nonvolatile semiconductor memory during execution of processing of the processors 111.

The arrangement of the storage device 120 will be described below with reference to FIG. 22. As described above, the storage device 120 includes the volatile semiconductor memory 121 and the plurality of nonvolatile semiconductor memories 122.

These volatile semiconductor memory 121 and nonvolatile semiconductor memories 122 are used as a main memory of the processors 111. In this embodiment, a sufficient memory size is reserved on each nonvolatile semiconductor memory 122, and the memory size of the nonvolatile semiconductor memory 122 is larger than that of the volatile semiconductor memory 121. In the volatile semiconductor memory 121, for example, data, which are more likely to be accessed such as data which are accessed recently and those which have high frequencies of use, are cached from the nonvolatile semiconductor memories 122. When each processor 111 accesses the volatile semiconductor memory 121, and the volatile semiconductor memory 121 does not store any access target data, required data is transferred from the nonvolatile semiconductor memory 122 to the volatile semiconductor memory 121. In this way, using the volatile semiconductor memory 121 and nonvolatile semiconductor memories 122 in combination, a memory space larger than the memory size of the volatile semiconductor memory 121 can be used as a main memory.

In this embodiment, the volatile semiconductor memory 121 is, for example, a DRAM (Dynamic Random Access Memory). However, as the volatile semiconductor memory 121, a memory such as an FPM-DRAM (Fast Page Mode DRAM), EDO-DRAM (Extended Data Out DRAM), or SDRAM (Synchronous DRAM), which is used as a main memory in a computer, may be used in place of the DRAM. If random accesses as fast as the DRAM can be made, and the upper limit number of accessible times is not substantially limited, a nonvolatile random access memory such as an MRAM (Magnetoresistive Random Access Memory) or FeRAM (Ferroelectric Random Access Memory) may be used in place of the volatile semiconductor memory 121. The volatile semiconductor memory 121 has a smaller size (for example, 128 Mbytes to 4 Gbytes) than each nonvolatile semiconductor memory 122 but allows accesses at higher speed.

In this embodiment, each nonvolatile semiconductor memory 122 is, for example, a NAND flash memory. However, the nonvolatile semiconductor memory 122 may be another nonvolatile semiconductor memory such as a NOR flash memory. The nonvolatile semiconductor memory 122 has a larger size (for example, 32 Gbytes to 512 Gbytes) than the volatile semiconductor memory 121 but requires a longer access time.

In the aforementioned arrangement, the MCU 10 in FIG. 1 corresponds to the processors 111, primary cache memories 116, and secondary cache memory 112 in FIG. 22, the MMUs 30 and 31 in FIG. 1 correspond to the memory management device 114 in FIG. 22, and the memory device 20 in FIG. 1 corresponds to the storage device 120 in FIG. 22.

As described above, the first to third embodiments are applicable to the arrangement shown in FIG. 22.

Modifications

As described above, the semiconductor device 1 according to the embodiment includes the processor 10 and memory device 20. The memory device 20 has the nonvolatile semiconductor storage device 22, and serves as a main memory for the processor 10. Upon execution of a plurality of programs CD1 and CD2, the processor 10 manages pieces of information required to execute these programs CD1 and CD2 as worksets WS1 and WS2 in correspondence with the programs CD1 and CD2. Furthermore, the processor 10 creates tables PT1 and PT2, which hold relationships between pieces of information required for the worksets WS1 and WS2 and addresses (virtual addresses) of these pieces of information in the memory device 20, in correspondence with the worksets WS1 and WS2. Accesses to the memory device 20 are executed with reference to the corresponding tables PT1 and PT2 for the worksets WS1 and WS2. Then, the tables PT1 and PT2 manage authority (valid-flags V and write-flags W) of the worksets WS1 and WS2 for accessing pieces of information in the memory device 20.

Figure 23:
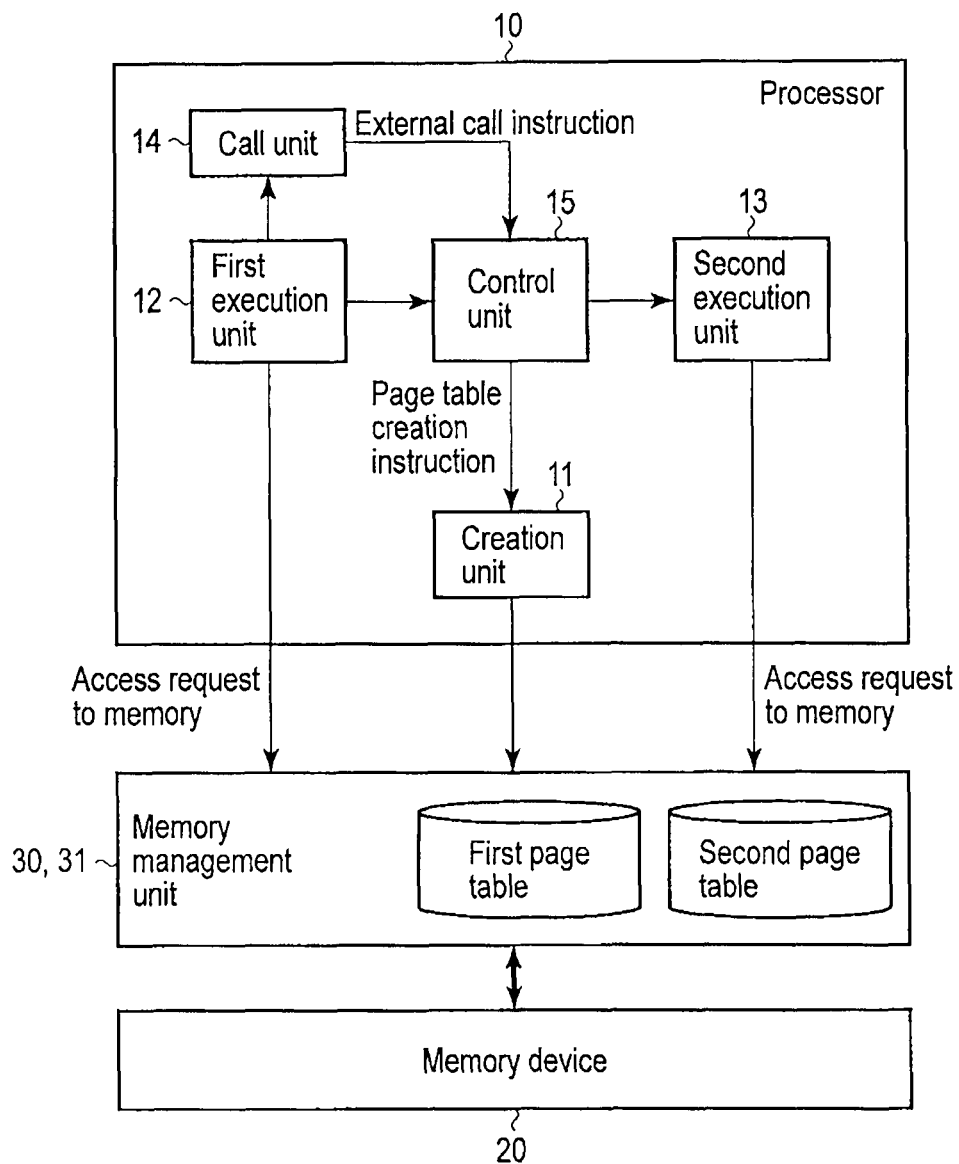
FIG. 23 is a block diagram of a semiconductor device according to the first to fourth embodiments.

The semiconductor device 1 according to the embodiment may be described below. FIG. 23 is a block diagram of the semiconductor device 1 according to the embodiment.

As shown in FIG. 23, the semiconductor device 1 includes memory managing units 30 and 31 which access the memory device 20 in response to a request from the processor 10. The processor 10 has a creation unit 11, first execution unit 12, second execution unit 13, call unit 14, and control unit 15 according to its functions.

The creation unit 11 creates first and second page tables PT1 and PT2 respectively for first and second worksets in response to, for example, an instruction from the control unit 15. Then, the creation unit 11 stores the first and second page tables PT1 and PT2 in memories or registers in the memory managing units 30 and 31. Of course, the creation unit 11 may store these tables in a memory or register in the processor 10. The first execution unit 12 executes a first program code CD1 in response to an instruction from the control unit 15. That is, the first execution unit 12 executes processing associated with the first workset WS1. The second execution unit 13 executes a second program code CD2 in response to an instruction from the control unit 15. That is, the second execution unit 13 executes processing associated with the second workset WS2. The call unit 14 issues, to the control unit 15, an external call instruction required to call the second program code CD2 from the first workset WS1. The control unit 15 transits the control from the first execution unit 12 to the second execution unit 13 in response to the external call instruction from the call unit 14.

That is, the creation unit 11 executes the processes in steps S11, S18, S26, and S28 in FIG. 5. The first execution unit 12 executes the processes in steps S13 and S14. The call unit 14 executes the processes in steps S15 and S16. The control unit 15 executes the processes in steps S10, S12, S17, S19, and S27. The second execution unit 13 executes the processes in steps S20 to S25.

The memory managing units 30 and 31 access the memory device 20 with reference to the first page table PT1 under the control of the first execution unit 12, and access the memory device 20 with reference to the second page table PT2 under the control of the second execution unit 13.

With this arrangement, data can be effectively protected while adopting a single-address system. That is, processing is managed using respective data set units called worksets, and page tables are created for respective worksets, while adopting the single-address system. Write bits W and valid bits V in the page tables can limit data accesses from the worksets. That is, when a reference access of a certain workset is to be permitted, it is permitted on a corresponding page table; otherwise, it is inhibited on the page table.

Note that upon execution of the operation shown in FIG. 16 of the second embodiment, some units of the processor 10 serve as an authority confirmation unit which executes the processes in steps S31 to S34, and based on a determination result of that functional block, for example, the creation unit 11 executes the processes in steps S33, S35, and S36. The same applies to the case upon execution of the operation shown in FIG. 18. That is, some units of the processor 10 serve as a data creation unit which executes the process in step S41, and an authority setting unit which executes the processes in steps S42 and S43, and based on a determination result of that functional block, for example, the creation unit 11 executes the processes in steps S45 and S46.

Note that the above embodiments can be variously modified. For example, the first to third embodiments have exemplified the case in which the number of worksets is 2. However, three or more worksets may be used. In this case as well, page tables are created in correspondence with these worksets.

The above embodiments have explained the case in which the workset is a set of all pieces of information (data, files, etc.) required to execute a certain program. However, worksets may be created in correspondence with users or processors when the plurality of processors are used as in FIG. 22.

Furthermore, the above embodiments have exemplified the page table having entries for all pages of the virtual address space. However, the page table is not limited to such configuration, and is not particularly limited as long as it can hold a correspondence relationship between the virtual address space and physical addresses. That is, for example, a multi-stage page table may be used. In the multi-stage page table, virtual addresses include, for example, a plurality of indices and offsets. Then, a first table is searched using a first index, and a second table designated by the first index is searched for an address. Furthermore, an offset is added to this address to obtain a physical address. With this configuration, a plurality of page tables are required. However, a size of each individual page table can be reduced.

The specific arrangement of the semiconductor device 1 is not limited to that described in the above embodiment, and need only execute the operations shown in FIG. 5, FIG. 16, FIG. 18, and/or FIG. 21. Also, the orders of processes in the flowcharts shown in FIG. 5, FIG. 16, FIG. 18, and/or FIG. 21 may be replaced as much as possible.

As for the management method of the NAND flash memory 22, various methods can be used. For example, when an SSD (Solid State Drive) is used, an SSD controller presents physical addresses to the MCU 10 like SATA (Serial ATA).

When the NAND flash memory 22 is connected to be directly visible as a memory from the MCU 10, the OS recognizes physical addresses and manages data exchange between the NAND flash memory 22 and DRAM 21.

Note that FIG. 1 has exemplified the arrangement in which the two MMUs 30 and 31 are arranged respectively for the DRAM 21 and NAND flash memory 22. However, this arrangement is merely an example, and these MMUs may be implemented by a single memory management device, as shown in FIGS. 22 and 23.

In the example of FIG. 1, the NAND flash memory 22 is directly connected to a memory bus. In this case, the MMU 31 may be implemented by either hardware or software. When the MMU 31 is implemented by software, it corresponds to the OS and page tables PT.

However, the NAND flash memory 22 may not be directly connected to the memory bus. FIG. 24 shows such example. FIG. 24 is a block diagram of the semiconductor device 1. As shown in FIG. 24, the memory device 20 includes the DRAM 21, NAND flash memory 22, and MMU 31. That is, the DRAM 21 is connected to the MCU 10, and accesses to the DRAM 21 are controlled by the MMU 30. The NAND flash memory 22 is connected to the DRAM 21 via the MMU 31, and is not directly connected to the MCU 10. Then, the MMU 31 assumes an address conversion function between the DRAM 21 and NAND flash memory 22. Even when the physical connections shown in FIG. 24 are adopted, the arrangement shown in FIG. 24 is seen from the MCU 10 (or a programmer) as FIG. 25 by the functions of the MMUs 30 and 31. FIG. 25 is a block diagram of the semiconductor device 1. As shown in FIG. 25, the memory device 20 is seen as if both the DRAM 21 and NAND flash memory 22 were controlled by the MMU 30.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory protection method of a semiconductor device, which uses a memory device including a nonvolatile semiconductor device as a main memory, the method comprising:
managing, by an operating system, information required to execute a first program as a first workset;
creating, by the operating system, a first table which holds a relationship between information included in the first workset and an address of that information in the memory device;
executing, by the operating system, the first program with reference to the first table;
calling, by the first program, a second program outside the first workset;
managing, by the operating system, information required to execute the second program as a second workset;
creating, by the operating system, a second table which holds a relationship between information included in the second workset and an address of that information in the memory device; and
executing, by the operating system, the second program with reference to the second table.

2. The method according to claim 1, wherein the first table and the second table respectively manage authority, of the first workset and the second workset, for accessing information stored in the memory device.

3. The method according to claim 1, wherein the second table allows information for the first workset to be also accessed by the second workset.

4. The method according to claim 1, wherein the memory device is managed by a single-address system.

5. The method according to claim 1, wherein the memory device further comprises a volatile semiconductor storage device, and
when data requested from a processor is held in the volatile semiconductor storage device, the requested data is read out from the volatile semiconductor storage device, and when the requested data is not held in the volatile semiconductor storage device, the requested data is read out from the nonvolatile semiconductor storage device.

6. The method according to claim 1, further comprising when information not included in the first workset is requested, updating the first table based on authority for accessing of the first workset to allow the first workset to access the information.

7. The method according to claim 1, further comprising generating, when information, which is not held in the memory device, is requested during execution of the first program, the requested information; and
updating the first table based on authority for accessing of the first workset to allow the first workset to access the generated information.

8. The method according to claim 1, wherein pieces of information required to execute the first program and the second program are managed as files and directories.

9. A semiconductor device comprising:
a processor; and
a memory device which has a nonvolatile semiconductor storage device and is configured to serve as a main memory for the processor,
wherein when the processor executes a plurality of programs, the processor manages pieces of information required to execute the programs as worksets for the respective programs, and creates tables, which hold relationships between pieces of information required for the respective worksets and addresses of the pieces of information in the memory device, for the respective worksets, and
the processor accesses to the memory device with reference to the corresponding tables for the respective worksets,
wherein the worksets include a first workset and a second workset, and the first workset and the second workset respectively include a first program code and a second program code,
the tables include a first table and a second table, which are respectively associated with the first workset and the second workset, and
when the first workset requires execution of the second program code, the processor transits control from the first workset to the second workset, and switches the table to be used from the first table to the second table.

10. The device according to claim 9, wherein the tables respectively manage authority, of the worksets, for accessing information in the memory device.

11. The device according to claim 9, wherein
tables are updated to allow information for the first workset to be also accessed by the second workset.

12. The device according to claim 9, wherein the memory device is managed by a single-address system.

13. The device according to claim 9, further comprising a memory management device configured to access the memory device in response to a request from the processor, wherein the processor includes:
a creation unit configured to create the first table and the second table;
a first execution unit configured to execute the first program code;
a second execution unit configured to execute the second program code;
a call unit configured to call the second program code from the first workset; and
a control unit configured to transit the control from the first execution unit to the second execution unit in response to a request from the call unit, and
wherein the memory management device accesses the memory device with reference to the first table under the control of the first execution unit, and accesses the memory device with reference to the second table under the control of the second execution unit.

14. The device according to claim 13, wherein the memory device further comprises a volatile semiconductor storage device, and when data requested from the processor is held in the volatile semiconductor storage device, the memory management device reads out the requested data from the volatile semiconductor storage device, and when the requested data is not held in the volatile semiconductor storage device, the memory management device reads out the requested data from the nonvolatile semiconductor storage device.

15. The device according to claim 9, wherein the processor updates, based on authority for accessing one of the worksets, one of the tables corresponding to the one of the worksets to allow the one of the worksets to access data not included in the one of the worksets.

16. The device according to claim 9, wherein the processor creates new data in response to a request from one of the worksets, and updates one of the tables corresponding to the one of the worksets to set authority for accessing the data.

17. The device according to claim 9, wherein the processor manages pieces of information required to execute the programs as files and directories.

* * * * *